United States Patent [19]
Gelfand et al.

[11] Patent Number: 5,635,061
[45] Date of Patent: Jun. 3, 1997

[54] PLATE SHIFTER MECHANISM

[75] Inventors: Leonid B. Gelfand; Wesley G. Koops; David J. Spyker, all of Holland, Mich.

[73] Assignee: JWI, Inc., Holland, Mich.

[21] Appl. No.: 377,537

[22] Filed: Jan. 23, 1995

[51] Int. Cl.⁶ .................................................. B01D 25/34
[52] U.S. Cl. ........................................ 210/225; 100/198
[58] Field of Search ........................... 210/225, 230; 100/198

[56] References Cited

U.S. PATENT DOCUMENTS

| | | | |
|---|---|---|---|
| 4,963,255 | 10/1990 | DeHaan et al. | 210/230 |
| 5,133,884 | 7/1992 | Carlsson et al. | 210/791 |
| 5,328,617 | 7/1994 | De Haan et al. | 210/768 |

FOREIGN PATENT DOCUMENTS

| | | | |
|---|---|---|---|
| 0 512 391 A1 | 11/1992 | European Pat. Off. . | |
| 35 20 571 A1 | 12/1986 | Germany . | |
| 29 23 967 C2 | 2/1987 | Germany . | |
| 3640171 | 5/1988 | Germany | 210/225 |
| 37 42 363 C1 | 11/1988 | Germany . | |
| 43 07 601 C1 | 5/1994 | Germany . | |
| 209623 | 11/1984 | Japan | 210/130 |
| 1653808 | 5/1991 | U.S.S.R. | 210/225 |

*Primary Examiner*—Matthew O. Savage
*Attorney, Agent, or Firm*—Flynn, Thiel, Boutell & Tanis, P.C.

[57] ABSTRACT

A shifter mechanism for a filter press, which mechanism includes a reciprocal housing supported for movement along the press side rail, and a stop pawl mounted on the housing for stopping shifter movement in one direction, and a drive pawl mounted on the housing for effecting opening movement of the frontmost filter plate in the opposite direction. A vibrator is mounted on the housing and is rotated in response to linear movement of the shifter mechanism in the opposite direction to effect raising of the filter plate being shifted, followed by dropping thereof onto the side rail to impose an impact thereon to assist in loosening of the filtrate adhered thereto.

15 Claims, 11 Drawing Sheets

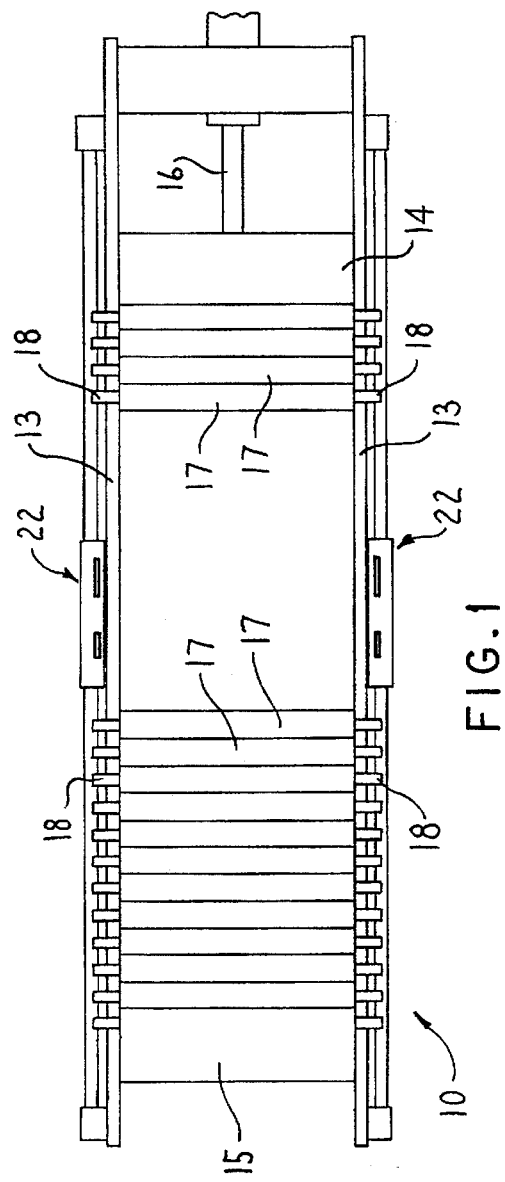
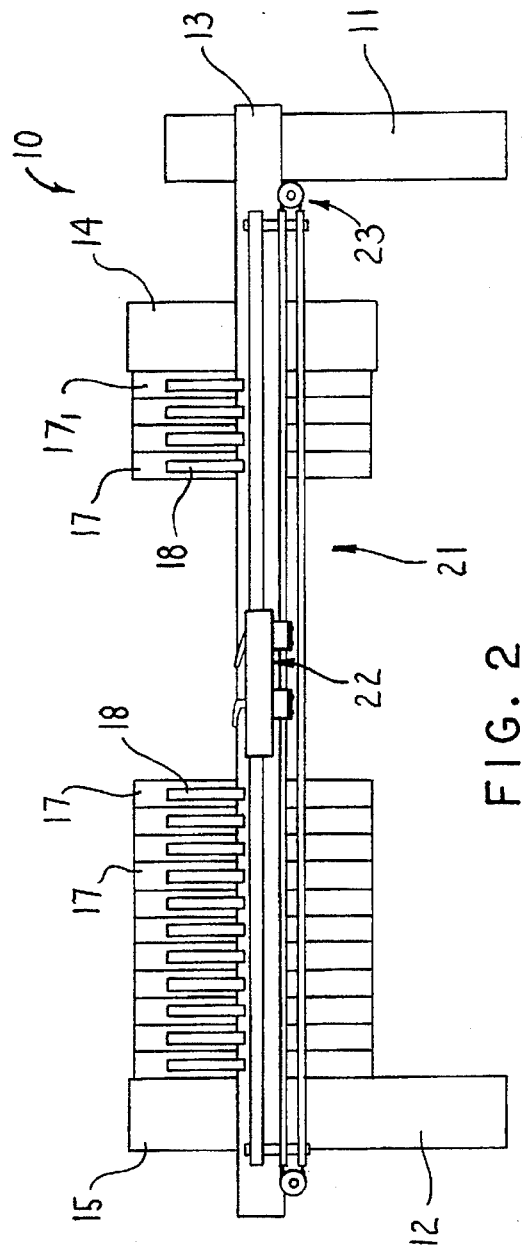

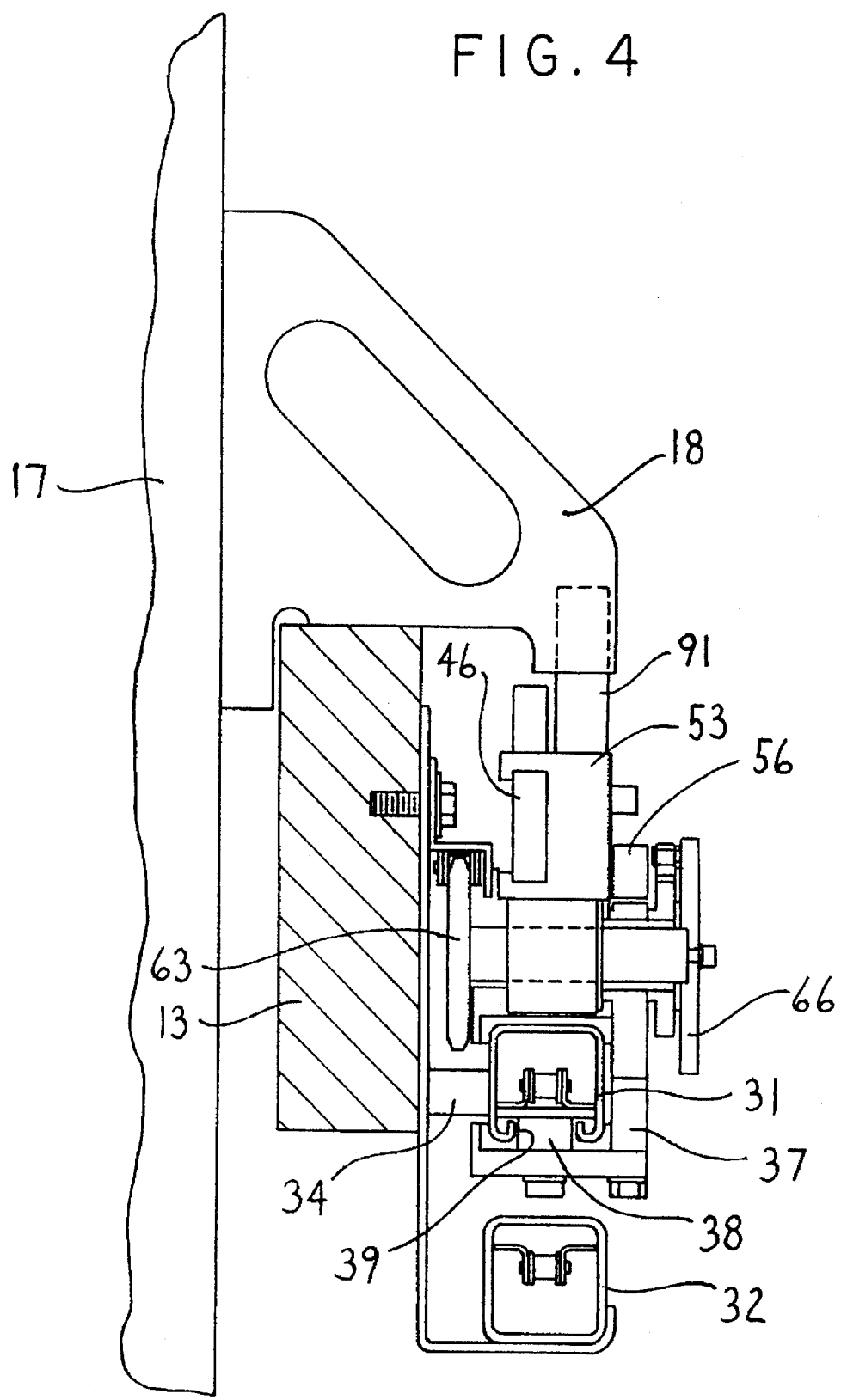

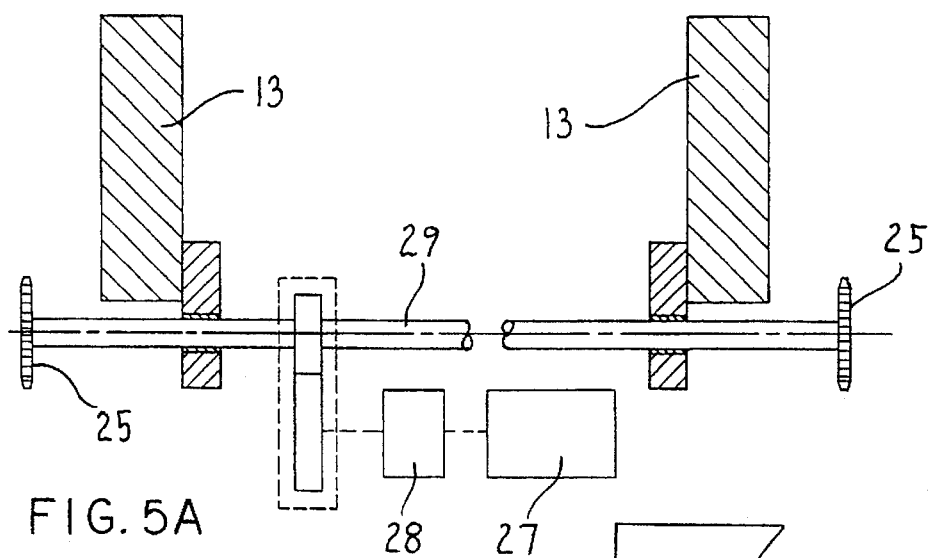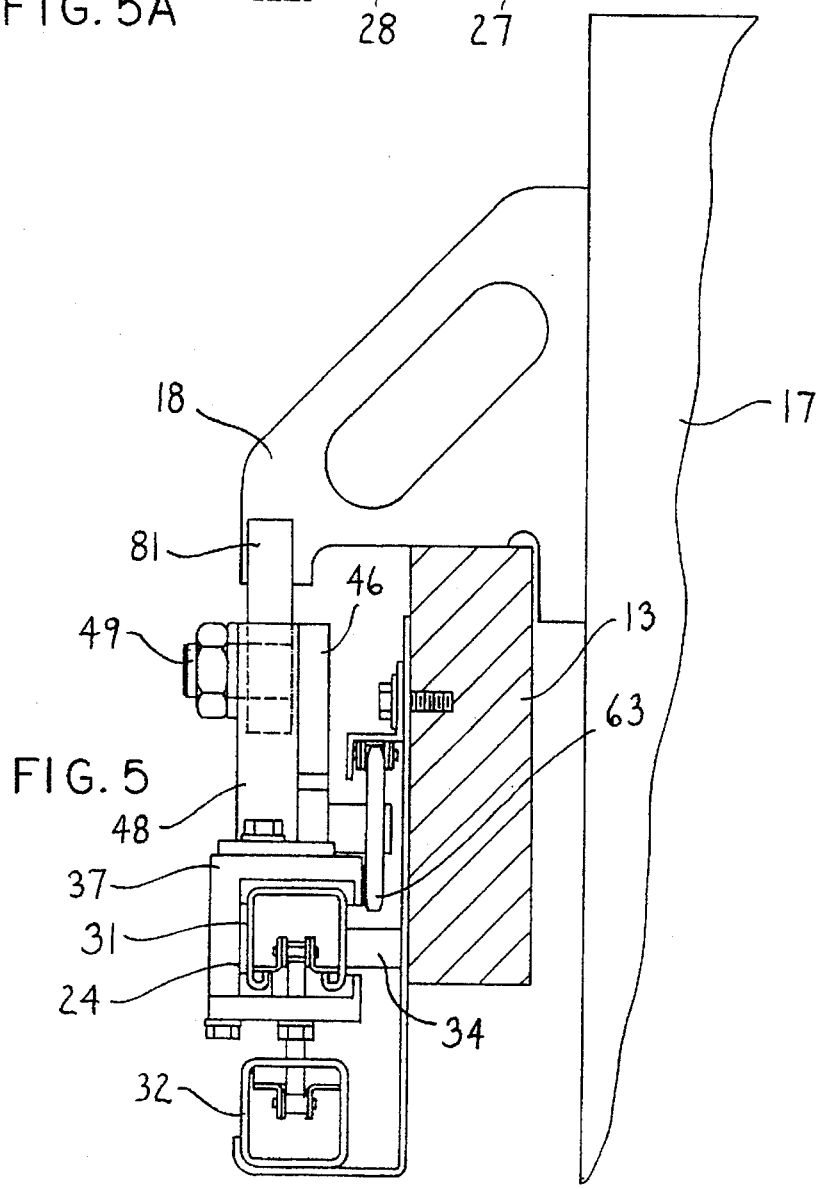

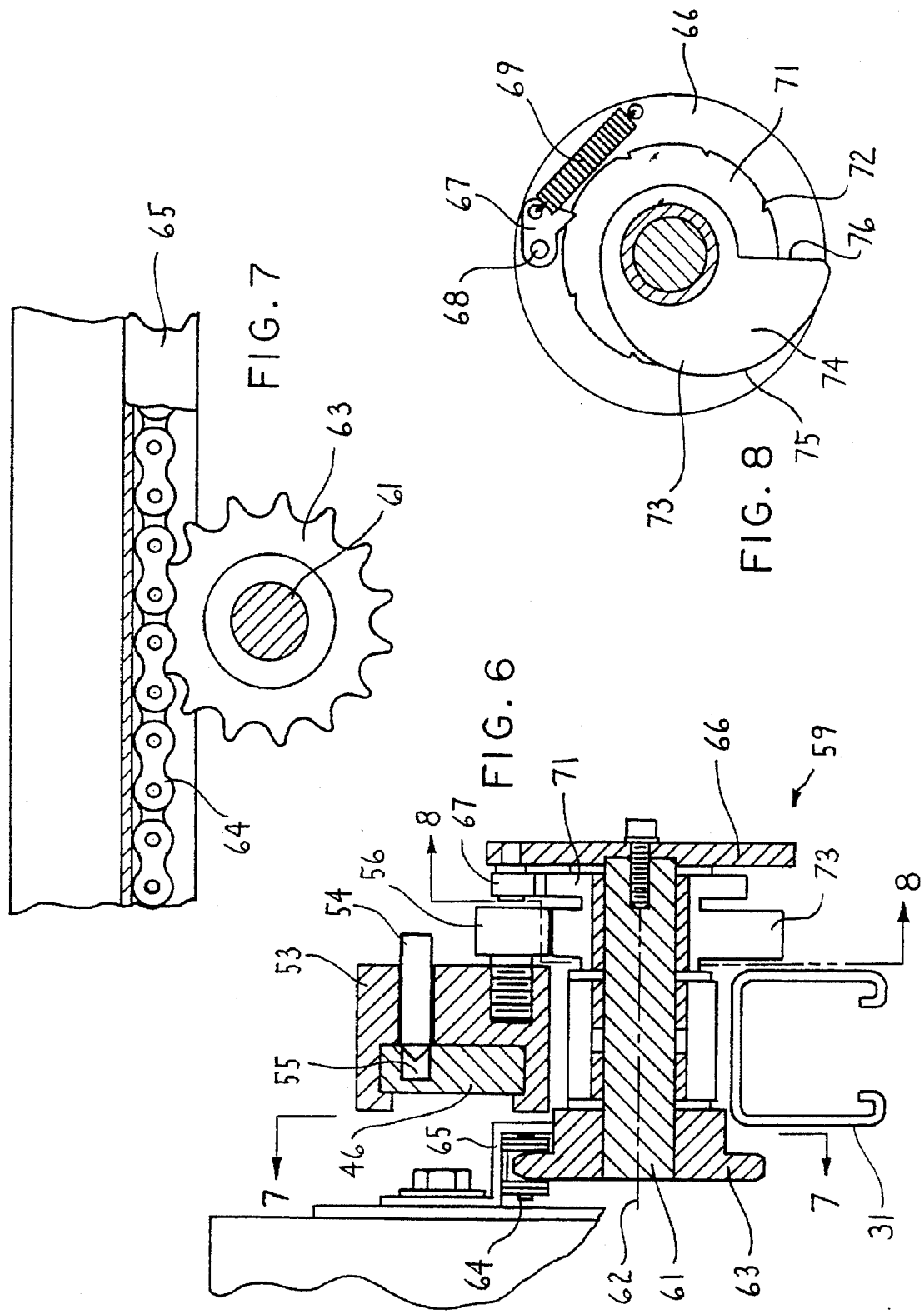

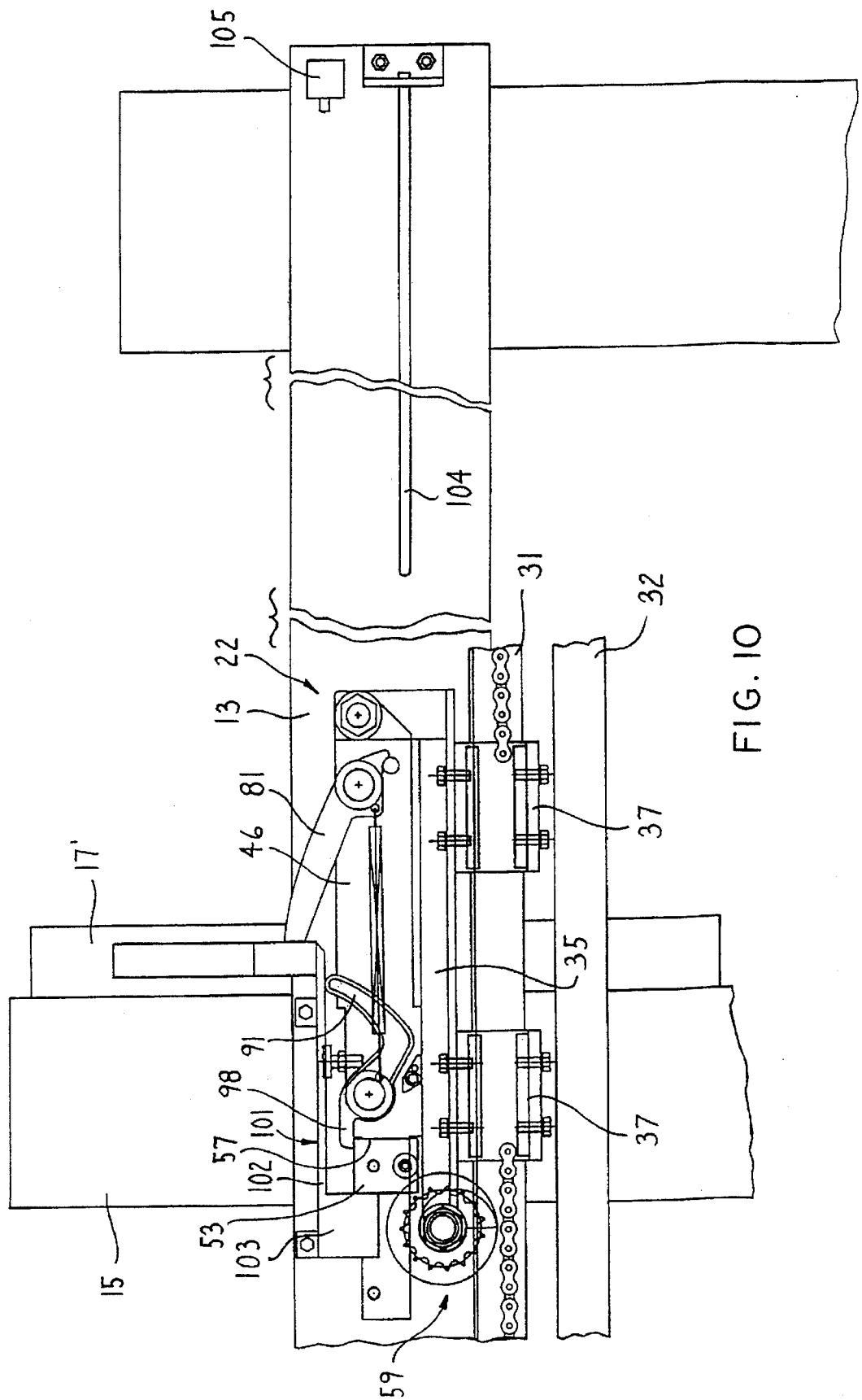

PLATE SHIFTER MECHANISM

FIELD OF THE INVENTION

This invention relates to a filter press and, more specifically, to an improved plate shifter for a filter press which employs a vibrating device for bumping the individual plates during opening movement thereof to assist in dislodgement of filtrate.

BACKGROUND OF THE INVENTION

Filter presses are well known and extensively utilized for separately solids from slurries. Such presses employ a plurality of filter plates which are held in contacting relationship between fixed and movable head members while the slurry is pumped into and through the press for collecting the solid in the form of filtrate or cake between adjacent filter plates. When the press is full, then the movable head is backed away from the plates into an open position and, in one conventional type of press, the plates are then individually and sequentially moved into an open position adjacent the movable head to permit discharge of the cake which has collected between adjacent pairs of plates. To permit movement of the plates into an open position, plate shifting mechanisms are typically provided adjacent opposite sides of the press for permitting either automatic or manual control over the plate movement and cake discharge.

In a conventional press, a pair of substantially identical plate shifter mechanisms are typically provided adjacent opposite sides of the press for synchronous cooperation with handles of the individual plates, whereby the shifter mechanisms reciprocate back and forth along the press side rails so as to individually but sequentially move each plate toward the movable opened head for permitting filtrate discharge. These mechanisms typically each employ a pair of movable stops or pawls, one for abutting the leading plate in the stack to prevent advancing movement of the shifter mechanisms, the other for engaging the opposite side of the leading plate to move it toward the movable head when the shifter mechanism is moved in the opposite direction. One example of such mechanism is disclosed in Assignee's earlier U.S. Pat. No. 4,963,255.

The conventional filter presses have often operated in a less than satisfactory manner, particularly when utilized with materials which result in a filtrate or cake having "sticky" properties. That is, relying solely on gravity to cause discharge of "sticky" cake from between the opened filter plates is often insufficient to effect proper discharge since the cake tends to stick to the filter cloths or membranes of the plates. It is often conventional practice to manually assist the discharge by having an operator scrape the sticky cake from the filter plates by use of a paddle or the like.

In an attempt to effect automatic discharge of sticky cake, and avoid the requirement of manual assistance, an attempt has been made to utilize air nozzles for blasting air against the cake to assist in loosening of the filtrate from the plate. Such arrangement is disclosed in Assignee's prior U.S. Pat. No. 5,328,617. The Assignee has also attempted to assist discharge by utilizing a vibrating or bumping device, but such device, as also disclosed in aforementioned U.S. Pat. No. 5,328,617, is a wholly independent mechanism provided on the arch of an arch-type shifting mechanism, and the bumping mechanism of this '617 patent engages the lead plate in the stack and effects bumping thereof only when the plate is still engaged with the stack, following which the plate is then moved into the open position. While this bumping is believed effective in assisting dislodgement of cake, nevertheless the position of the bumping and the mounting of the mechanism as disclosed in the '617 patent is not believed to provide for optimum utilization of this bumping characteristic.

In another known press, specifically a press manufactured and sold by Perrin of Canada, the filter plates are joined together through a control device such as a cable or linkage so that, during opening of the press, all of the plates are substantially simultaneously moved into an open separated condition with the spacing or separation between each adjacent pair of plates being controlled by the connecting linkage. All of the plates, adjacent one side thereof, are supported on an elongate tube which extends longitudinally along the press and is of square or rectangular profile. This tube is then rotated to impose a vibration or bouncing movement on the handles provided adjacent one side of the filter plates, whereby all of the plates are simultaneously vibrated to assist in discharge of the sticky cake. While this arrangement is at least partially effective for permitting discharge of sticky cake, nevertheless such arrangement is undesirable from a structure standpoint since it requires an additional vibrating drive shaft extending longitudinally throughout substantially the length of the press, and in addition requires a long support frame or support rail arrangement since all of the filter plates are moved into an opened and spaced relationship at the same time.

Accordingly, it is an object of this invention to provide an improved shifter mechanism for a filter press, which mechanism incorporates a vibrating mechanism for effecting bumping of individual filter plates as they are moved in an opening direction so as to assist in dislodgement of filtrate therefrom.

It is also an object of the invention to provide an improved shifter mechanism, as aforesaid, which is of simple structure and operation, is inexpensive to construct, is reliable in operation, and provides a vibrating function for the filter plate at the same time as such plate is being moved in an opening direction without requiring extraneous complex structures or functions.

In the improved shifter mechanism of the present invention, as aforesaid, the mechanism includes a reciprocal housing which is supported for movement along the side rail and, in additional to the usual stop pawls for stopping shifter movement in one direction and effecting opening driving of the frontmost filter plate in the opposite direction, also includes a vibrator which is rotated in response to linear movement of the shifter mechanism carriage in said opposite direction, with this rotary vibrator in turn effecting raising of the filter plate being shifted, followed by dropping thereof onto the side rail so as to impose an impact thereon to assist in loosening of the filtrate adhered thereto.

Other objects and purposes of the invention will be apparent to persons familiar with structures of this general type upon reading the following specification and inspecting the accompanying drawings.

BRIEF DESCRIPTION OF THE DRAWINGS

FIGS. 1 and 2 are diagrammatic top and side views, respectively, of a filter press.

FIG. 4 is an enlarged end elevational view taken generally along line 4—4 in FIG. 3.

FIG. 5 is an enlarged end elevational view taken generally along line 5—5 in FIG. 3.

FIG. 5A is a diagrammatic view along line 5A—5A in FIG. 3.

FIG. 6 is an enlarged fragmentary sectional view taken along line 6—6 in FIG. 3.

FIG. 7 is a view along line 7—7 in FIG. 6.

FIG. 8 is a view along line 8—8 in FIG. 6.

FIG. 10 is a similar schematic view showing the shifter mechanism positioned adjacent the stationary head of the filter press and being returned to its home position to complete the shifting cycle.

Figure 3:
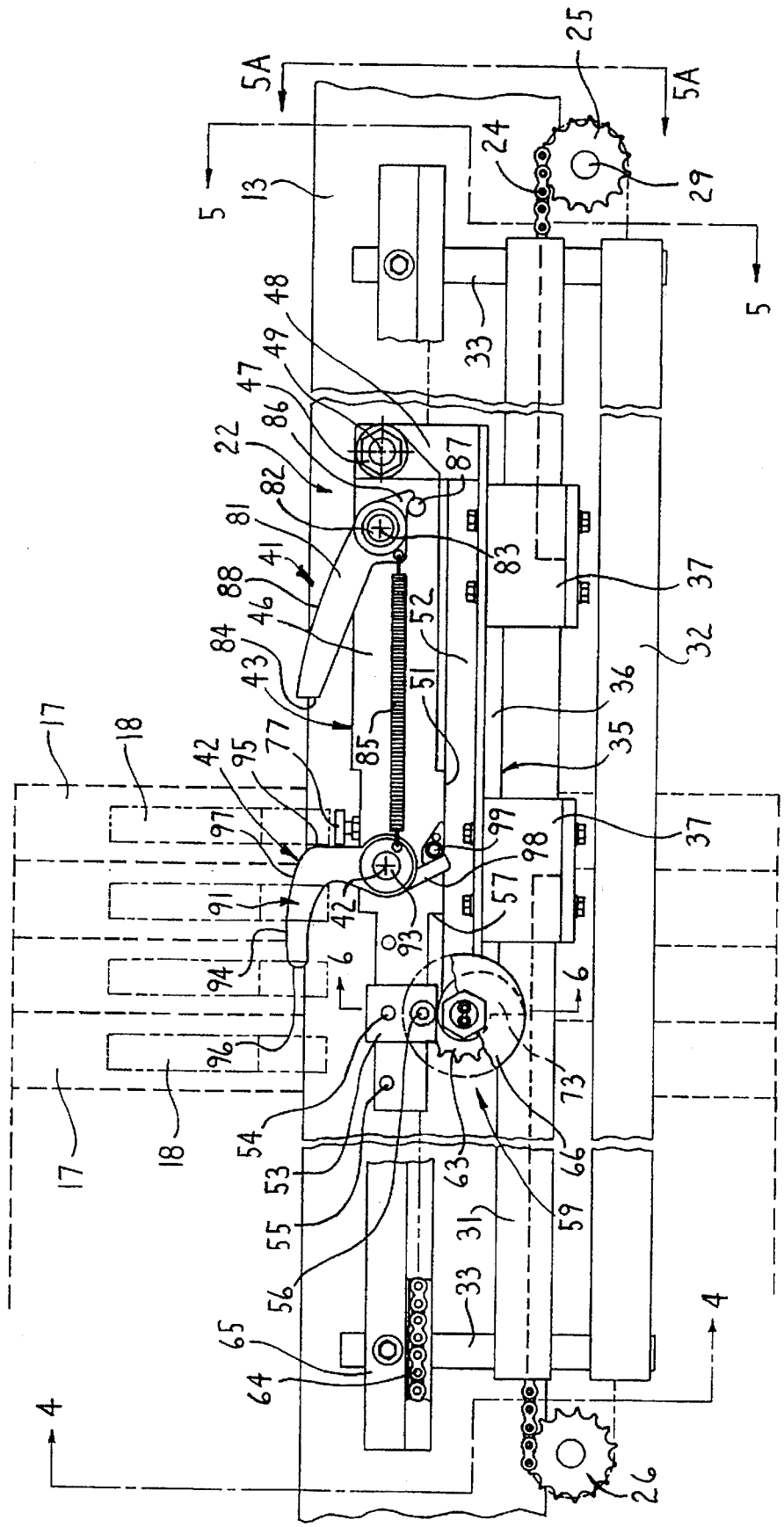
FIG. 3 is an enlarged, fragmentary side or elevational view showing the improved shifter mechanism associated with one side of a filter press according to the present invention.

Certain terminology will be used in the following description for convenience in reference only, and will not be limiting. For example, the words "upwardly", "downwardly", "rightwardly" and "leftwardly" will refer to directions in the drawings to which reference is made. The word "forwardly" will be used in relationship to leftward shifting of the filter plates in FIGS. 1 and 2, and the word "rearwardly" will refer to rightward shifting of the filter plates in FIGS. 1 and 2. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

As shown in FIGS. 1 and 2, there is illustrated a generally conventional filter press 10 having a pair of end supports 11 and 12 rigidly joined together by a pair of generally parallel and horizontally elongate side rails 13, which side rails are sidewardly spaced apart and cooperate with the end supports to define a generally rigid frame.

The filter press has a movable follower or head arrangement 14 disposed adjacent one end of the press frame and is slidably supported for movement along the side rails 13. This movable head 14 is slidably displaceable horizontally along the side rails toward or away from a further head 15 which is fixed to the frame adjacent the other end of the side rails. A drive device 16, such as a conventional double-acting pressure cylinder, is mounted on the frame and cooperates with the movable head 14 for controlling movement thereof either toward or away from the fixed head 15.

A plurality of conventional filter plates 17 are suspendingly supported on and between the side rails 13. The filter plates extend generally transversely between the side rails so that the plates are disposed in adjacent relationship to form a generally horizontally extending stack of plates in the longitudinal direction of the press. Each filter plate 17 has support arms or handles 18 which project outwardly from opposite sides of the respective filter plate in overlapping and slidable supportive engagement with the upper edges of the side rails 13, thereby enabling the filter plates to be slidably displaced along the side rails in the longitudinal direction of the filter press. The support arms or handles 18 have a width in the lengthwise direction of the press which is significantly less than the width of the respective filter plates 17, whereby adjacent handles 18 define clearance spaces of predetermined width therebetween when adjacent filter plates are in abutting engagement, substantially as illustrated by FIG. 2.

As is conventional, the driving device 16 is activated to move the head 14 forwardly (leftwardly in FIGS. 1 and 2) so that the stack of filter plates 17 are snugly and tightly held between the opposed heads 14 and 15. One or both of these heads have suitable conduits (not shown) connected therethrough for communication with the interior of the stack of filter plates. A slurry is supplied through one of the heads into the stack of filter plates, and the cleaned liquid flows outwardly through the plates and out through a conduit, whereupon the solids collect on the filters or membranes which extend across the ringlike frames of the filter plates.

To permit removal or dumping of the solids (i.e., filtrate or cake) which collect on the filter plates, the head 14 is moved rearwardly (rightwardly in FIGS. 1 and 2) into an open position substantially as illustrated by solid lines in FIG. 2, and then the filter plates 17 are individually and sequentially moved rearwardly (leftwardly in FIG. 2) away from the stack toward the movable head 14 to permit the solids which collect between plates to drop downwardly for deposit into a suitable collecting bin. To effect sequential and individual movement of the filter plates 17 away from the stack toward the open head 14, the filter press 10 has a plate shifting arrangement 21 which includes a pair of plate shifter mechanism 22, one such mechanism 22 being disposed exteriorly adjacent each of the side rails 13, and a drive device 23 which connects to the pair of shifter mechanisms 22 for effecting synchronous linear back-and-forth movement of these mechanisms 22 along the side rails 13.

The driving device 23, as shown in FIG. 3, includes an elongate flexible drive member 24, specifically a chain, which extends generally longitudinally parallel with the adjacent side rail 13 and is supportingly engaged and driven by a drive sprocket 25 which is rotatably supported adjacent one end of the press, and is engaged on a rotatable idler sprocket 26 rotatably supported adjacent the other end of the press. The drive sprocket 25 is nonrotatably coupled to a drive shaft 29 which extends generally horizontally transversely of the press and is driven by a reversible drive motor 27 through a conventional torque-sensing reversing mechanism 28. The drive shaft 29 extends transversely across the press frame and is provided with identical drive sprockets 25 on opposite ends thereof which engage drive chains 24 provided adjacent the opposite side rails 13 so as to permit synchronous driving of the two shifter mechanisms 22 which are disposed adjacent the opposite side rails 13.

The overall structure and function of the filter press 10 as described above, including the driving device 23, is conventional and well known.

Considering now the shifter mechanisms 22, the two mechanisms 22 as positioned adjacent opposite sides of the press are identical except for being mirror images of one another, and hence only one such mechanism will be described below.

Referring to FIGS. 3–8, the shifter mechanism 22 includes a carrier or housing 35 which includes a longitudinally elongated base 36 to which is secured a pair of downwardly-projecting U-shaped slides 37, the latter being slidably and guidably supported on an elongate guide tube 31. This guide tube 31 is positioned adjacent and spaced slightly outwardly from the exterior side of the respective side rail 13, and extends generally horizontally and longitudinally therealong such that opposite ends of the guide tube 31 terminate adjacent the sprockets 25 and 26. The guide tube 31 is fixed to the adjacent side rail through intermediate supports 34 which project sidewardly from the side rail. The guide tube 31 is aligned with upper portions of the sprockets 25 and 26, and the upper reach of the drive chain 24 is enclosed within and projects longitudinally through the guide tube 31.

A further guide tube 32 is disposed a small distance below the upper guide tube 31 and extends longitudinally in parallel relationship therewith, with the tube 32 being fixedly secured to the adjacent side rail 13 by brackets 33. The lower guide tube 32 is aligned with lower portions of the sprockets 25 and 26, whereby the lower reach of the drive chain 24 extends therethrough.

The upper reach of the drive chain 24 is anchored relative to the carrier 35 of the shifter mechanism 22 so as to cause back-and-forth movement of the shifter mechanism longitudinally of the press. For this purpose the U-shaped slides 37 each have a connector 38 fixed to the lower leg thereof and projecting upwardly through a longitudinally extending slot 39 formed in the bottom wall of the upper guide tube 31. The connector 38 is slidably supported within the guide tube 31 and has the upper reach of the drive chain 24 fixed thereto.

The shifter mechanism 22 mounts thereon a stop device 41 which coacts with the filter plates to limit forward (leftward in FIG. 3) movement thereof, a plate return device 42 for engaging the lead filter plate of the stack and moving it rearwardly (rightwardly in FIG. 3) toward the opened head 14, and a vibrating device 43 for effecting vibrating or bumping of the lead filter plate during the opening movement thereof.

Considering the vibrating device 43, it includes a support member 46 movably mounted on the carrier 35. The support member 46 is horizontally elongated in the longitudinal direction of the press, and at one end thereof is connected by a pivot 47 to an upright 48, the latter being fixed to the carrier 35. The pivot 47 defines a pivot axis 49 which extends horizontally and perpendicularly with respect to the longitudinal (i.e. lengthwise) direction of the press. This support lever 46 defines thereon a lower edge 51 which normally abuts against a horizontally elongate rail 52 which is fixed to the carrier 35 so as to define the normal lowermost position of the support lever 46. The support lever is normally maintained in this lowermost position due to the urging of gravity. It will be appreciated, however, that a spring could also be provided for urging the support lever into this lowermost position.

The support lever 46, adjacent the free end thereof, movably mounts thereon a follower member or shuttle 53 which, as illustrated in FIGS. 4 and 6, has a generally U-shaped configuration so as to be supported on but slidable lengthwise of the lever 46. The shuttle 53 mounts thereon a spring-urged plunger 54, the inner end of which has a ball-like end adapted for engagement within one of a series of depression 55 formed in the sidewall of the support lever 46, there being three such depression 55 which are spaced apart in the lengthwise extent of the lever 46 so as to define three different positions for the shuttle, as explained hereinafter.

The shuttle 53 mounts thereon a roller-type cam follower 56, the latter being positioned directly above and cooperating with a rotary cam arrangement 59 which is mounted on the carrier 35 adjacent the forward end thereof.

The rotary cam arrangement 59 includes a shaft 61 which is supported on the carrier 35 for rotation about a generally horizontally axis 62 which extends perpendicular to the longitudinal direction of the press, and this shaft at its inner end has a driving sprocket 63 nonrotatably secured thereto. Sprocket 63 in turn is engaged with an elongate stationary reaction member 64, such as a chain, which is stationarily positioned and extends longitudinally along the respective side rail 13. This reaction chain 64 is positioned under a generally Z-shaped shield member 65 which is fixed to the side rail.

The other or outer end of shaft 61 has a cam driving plate 66 fixed thereto, the latter mounting a one-way drive pawl 67 on the inner side thereof. This pawl 67 is pivotally supported at 68 on the cam driving plate 66, and is biased radially inwardly by spring 69 toward the periphery of a pawl plate 71 which is positioned axially adjacent the cam driving plate 66. The pawl plate 71 has a plurality of circumferentially spaced drive notches 72 formed in the periphery thereof, which notches are spaced to receive the nose of the drive pawl 67 therein so as to effect one way driving of the pawl plate 71. This pawl plate 71 is concentric with but rotatably supported relative to the shaft 61 through an intermediate sleeve bearing, and the pawl plate 71 in turn is nonrotatably secured to an axially adjacent cam 73 which is also rotatably supported in surrounding relationship to the shaft 61.

The cam 73, in the illustrated embodiment, has a single lobe 74 which on its periphery defines a radially outwardly projecting ramp 75 which extends through a substantial rotational angle, which angle is about 180° in the illustrated embodiment, and this ramp at its radially outer end terminates in a drop off edge 76 which projects radially inwardly to the base diameter of the cam, which base diameter defines a peripheral edge which extends through the remaining 180° of the cam. The cam 73 is positioned directly under and hence the periphery thereof is maintained in engagement with the roller follower 56 mounted on the shuttle 53.

Considering the stop device 41 as associated with the shifter mechanism, this device includes a stop member 81 which is preferably formed as an elongate pawl or lever, the latter in the illustrated embodiment being supported at one end by a pivot 82 which defines a generally horizontal axis 83 which extends generally perpendicularly relative to the longitudinal direction of the press. The stop lever 81, in the illustrated embodiment, has its pivot 82 supported on the support lever 46 in the vicinity of the pivot 47. This stop lever or pawl 81 defines an abutment surface 84 at the free end thereof which is adapted to abuttingly contact a front side or surface of the filter plate handle 18.

The stop pawl 81 is normally urged into an upper position, substantially as illustrated by FIG. 3, by a biasing spring 85. The stop pawl 81 also has a radially projecting tab or stop 86 thereon which is positioned for abutting engagement with a stop pin 87 fixed to the support lever 46, which stop pin 87 and its engagement with the tab 86 functions to define the upper (i.e. stopping) position of the stop pawl due to the urging of the spring 85. The stop pawl 81 also has the upper surface 88 thereof formed with a gradual convex curvature so as to function as a cam surface for slidable cooperation with the handles of the filter plates.

Considering now the plate driving device 42 as also provided on the shifter mechanism, it is defined by a driving member 91 which is also formed as a pawl or lever, the latter being supported on the support lever 46 by a pivot 92, the axis 93 of which extends parallel with the axis 83 of the stop pawl. The pivot 92, however, is spaced outwardly in the lengthwise direction of the support lever by a substantial distance from the pivot 47, whereby the stop pawl 81 and the drive pawl 91 are spaced from one another in the longitudinal direction of the press, with the drive pawl 91 being positioned more closely adjacent the forward end of the shifter mechanisms.

The drive pawl 91 includes a generally L-shaped arm 94 which projects outwardly from the pivot 92, and the radially outwardly projecting inner portion of this arm defines on the front face thereof an abutment surface 95 which is adapted to abuttingly contact a rear surface of the filter plate handle 18. This radially outwardly projecting inner arm portion is in turn integrally joined to a circumferentially extending outer arm portion which projects in the forward direction of the press when the drive pawl 91 is in the normal raised position illustrated in FIG. 3. The drive pawl 91 terminates in a rounded free end 96 which in turn merges smoothly with a generally smooth and convex curved upper surface 97 of the pawl.

The drive pawl 91 also has a radial tab or stop 98 which is fixed thereto and projects outwardly for engagement with a cooperating stop 99 which is fixed to the support lever 46. The engagement of tab 98 against stop 99 functions to define the normal raised position of the drive pawl 91 as soon in FIG. 3, and the drive pawl is normally maintained in this raised position due to the biasing of a suitable spring, this being one end of the spring 85 in the illustrated embodiment, although a separate spring could be provided if desired.

The stop pawl 81 and drive pawl 91, when maintained in the raised positions, are disposed so that the upper extremities thereof are at an elevation above the lowermost extremity of the handles 18 associated with the filter plates 17, and the upper extremities are positioned for engaging cooperation with the handles as the shifter mechanism is moved relative to the filter plates.

To provide for reversing of the shift mechanism 22 after all of the plates have been moved to the open position, there is provided a control member 101 (FIG. 10) which is fixedly mounted on the press frame, specifically the side rail, adjacent the fixed head end of the press. This control member 101 projects outwardly from the side rail and includes a longitudinally elongate hold down member 102 which defines thereon a downwardly facing surface which slidably cooperates with and maintains the drive member 91 in its lowered or nondriving position. The control member 101 also includes a stop 103 provided adjacent the outer end of the hold down member 102 and positioned for abutting contact with the shuttle 53 so as to effect inward shifting thereof along the support lever 46 from the bump position shown in FIG. 3 to an inboard position as shown in FIG. 10, in which latter position the shuttle 53 abuts a shoulder 57 defined on the support lever 46.

At the other end of the press, namely adjacent the end of the side rail adjacent the moving head 14, there is mounted a further control stop 104 which is secured to and positioned outwardly away from the side rail so as to be disposed for cooperation with the shuttle 53. This stop 104 preferably comprises an elongate rodlike element which is cantilevered longitudinally along the side rail so as to terminate in a free end which abuts the shuttle 53 and effects slidable movement thereof along the support lever 46 back into the bump position as the shifter mechanism closely approaches its endmost or "home" position adjacent the end (the rightward end in FIGS. 1 and 2) of the press. A switch, such as a conventional limit switch 105, is also disposed at this end of the press and positioned for contact with the carrier 35 when it reaches its home position so as to deactivate the driving motor 27.

When the drive lever 91 is held in the retracted position by the hold down member and the stop 103 contacts and effects shifting of the shuttle 53 into the innermost or "home" position, this results in the shuttle 53 being positioned directly under the stop tab 98 associated with the drive member 91. This prevents the drive member 91 from being returned to its raised position by the urging of the spring 85.

The operation of the filter press incorporating the shifter mechanism 22 as discussed above will now be briefly described to ensure a complete understanding thereof.

The press 10 is initially closed by moving the head 14 towards the fixed head 15 so as to maintain the stack of filter plates 17 in substantially sealed engaged relationship with one another between the heads. In this closed position, the shifter mechanisms 22 are maintained in an inactive "home" position adjacent the rightward ends of the side rails 13, namely the end of the press which supports the moving head. The filtrate is then pumped into the press so as to permit collection of filtrate between adjacent filter plates. After the press has become sufficiently filled with solids, the pump is shut down and the head 14 is returned to its opened position. The movable head 14 normally has one of the filter plates fixed thereto, such as the plate designated $17_1$ in FIG. 2, and this plate is automatically moved into the open position along with the head 14.

Figure 9A:
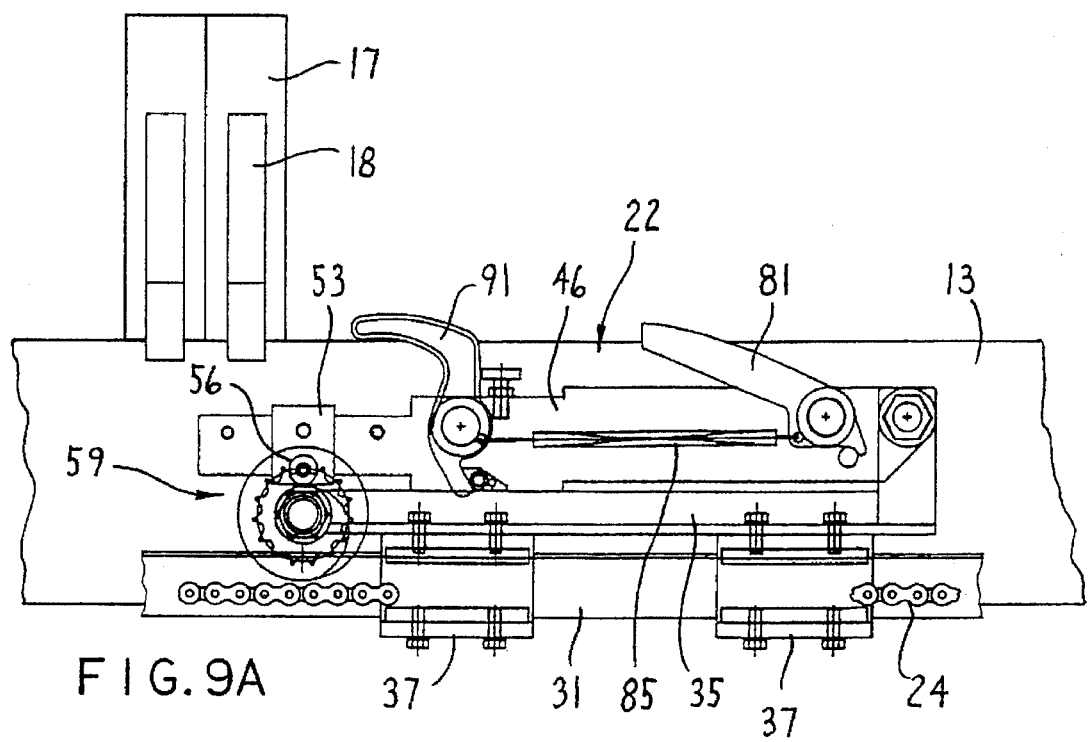
FIGS. 9A through 9G are schematic views which sequentially illustrate the position and movement of the shifter mechanism in effecting opening movement of individual plates accompanied by vibrating or bumping of the individual plate during the opening movement thereof.
Figure 9B:
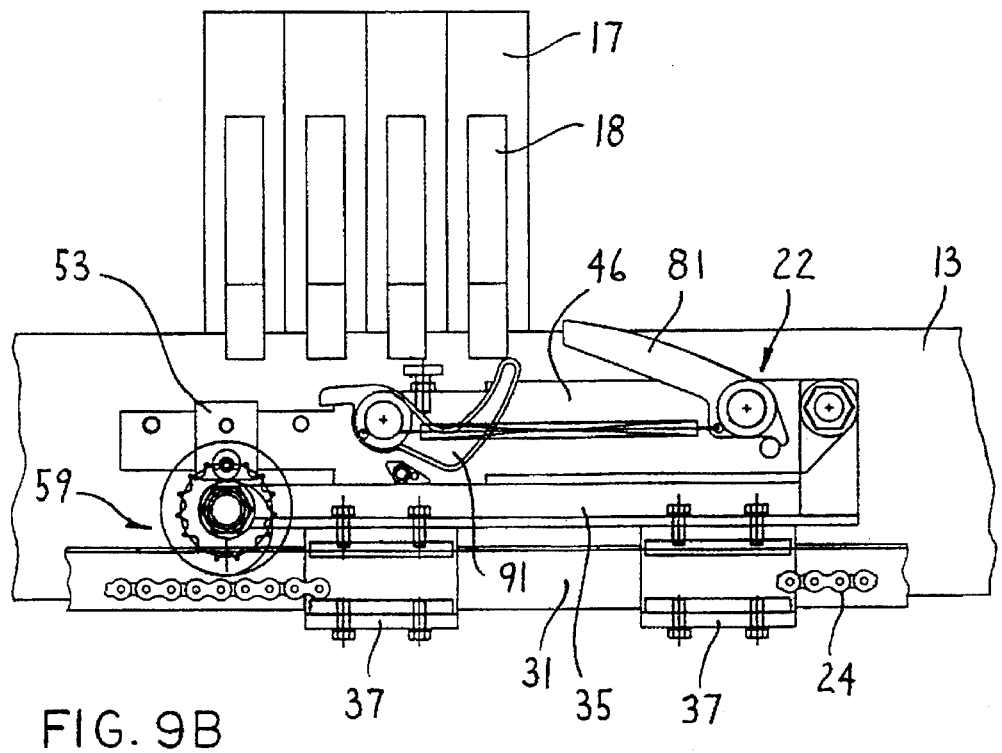

The motor 27 of the shifter driving device 23 is activated so that sprockets 25 are rotated in a direction so as to cause the shifter mechanism 22 to be moved forwardly (leftwardly) toward the stack of filter plates disposed adjacent and projecting outwardly from the fixed head 15. As the shifter mechanism 22 is moved toward the stack of filter plates, the stop and drive pawls 81 and 91 are both in their upper positions substantially as illustrated in FIG. 9A. When the shifter mechanism reaches the leading end of the stack of filter plates and the rounded nose or free end of the drive pawl 91 contacts the front face of the support handle 18 on the leading or endmost filter plate, the drive pawl 91 is pivotally swung downwardly (clockwise) against the urging of the spring into the lowered or retracted position shown in FIG. 9B, thereby enable the drive pawl 91 to pass under the handle 18. The shifter mechanism continues its forward movement until the nose or free end of the stop pawl 81 contacts the front face of the handle 18 of the endmost filter plate substantially shown in FIG. 9C. In this position, the outer arm portion of the drive pawl 91 projects generally upwardly and is aligned with and vertically urged upwardly by the spring into the clearance space defined between the handles of the two adjacent endmost filter plates.

Figure 9C:
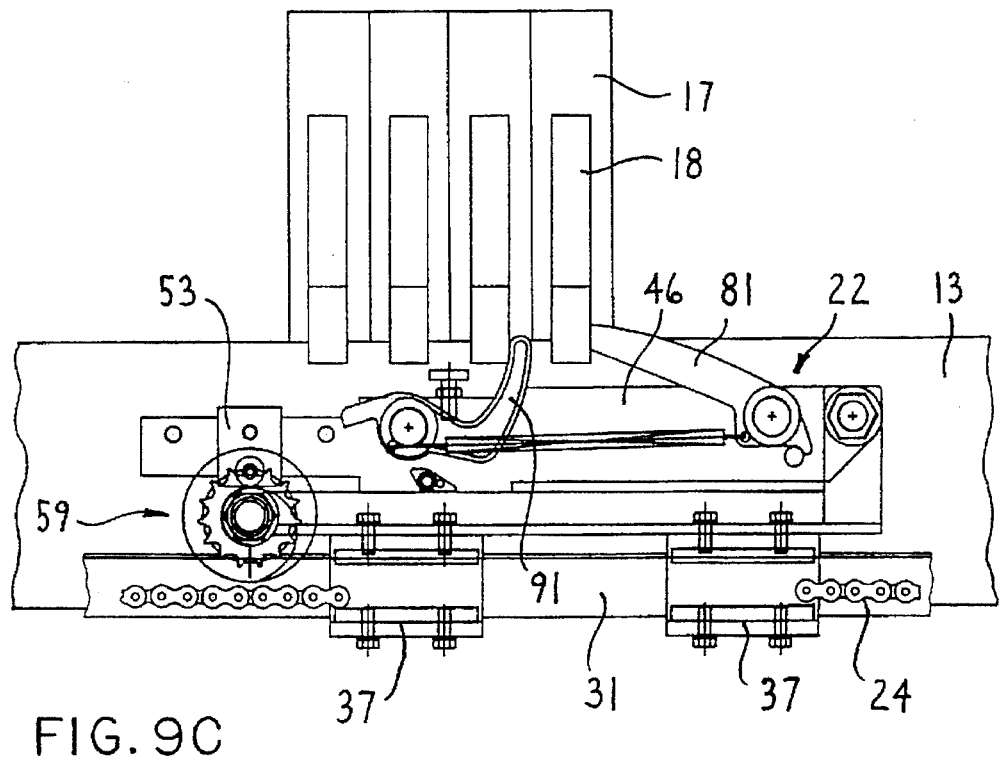
Figure 9D:
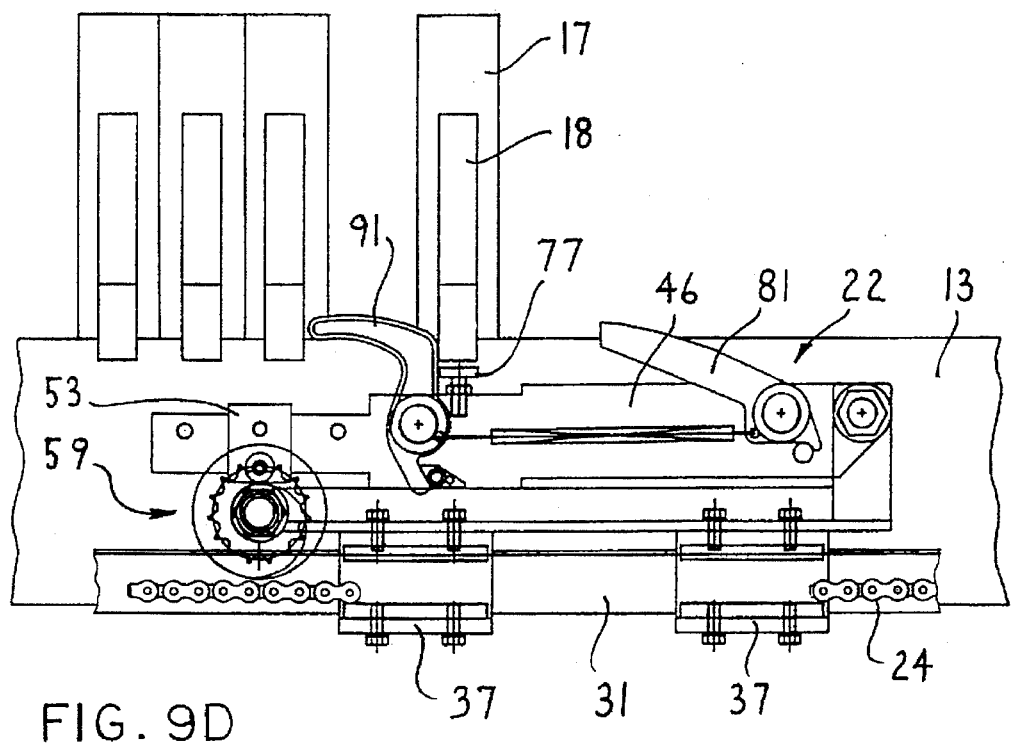

Due to the contact of the stop pawl 81 against the endmost filter plate as illustrated by FIG. 9C, the forward driving movement of the shifter mechanism stalls, and the torque overload sensor associated with the driving arrangement senses this stall or overload condition, and causes an automatic reversing of the drive motor 27 so as to initiate rearward (rightward) or return movement of the shifter mechanism 22. During initial rearward movement, which initially results in movement of the stop pawl 81 away from the endmost or leading filter plate, the drive pawl 91 is spring-urged upwardly (counterclockwise) into the clearance space between the handles of the adjacent pair of endmost plates and, due to the configuration of the driving pawl 91, the nose or free end thereof reacts against the second plate and the cam surface 97 thereof reacts against the rear side of the handle on the lead or endmost filter plate, causing the endmost filter plate to be shifted rearwardly a small distance away from the next adjacent plate, substantially as illustrated by FIG. 9D. In this position, the drive pawl 91 is prevented from further counterclockwise rotation since it is now engaged with the stop 99, and the abutment surface 95 thereon engages the rear of the handle on the endmost filter plate.

Continued rearward or return movement of the shifter mechanism 22 toward the open head 14 causes the shifter mechanism to move away from the position illustrated in FIG. 9D toward the opened head 14. During this return movement, the sprocket 63 is rollingly engaged with the reaction chain 64 so as to cause rotation of shaft 61. This causes rotation of cam driving plate 66 in the direction indicated by the arrow in FIG. 8, whereby pawl 67 drivingly engages the pawl plate 71 to effect corresponding rotation of the cam 73 as the shifter mechanism 22 and the endmost or leading filter plate are moved toward the opened head 14.

Figure 9E:
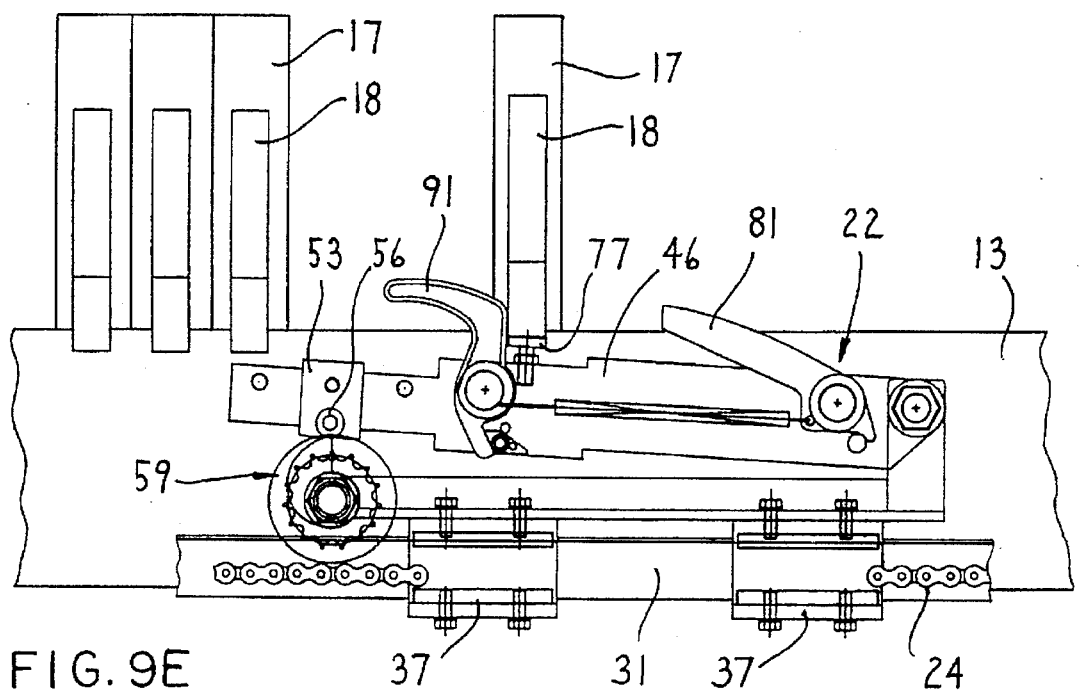

The rotation of the cam 73, and its reaction with the follower 56 on the shuttle 53, causes the shuttle 53 to initially swing the support lever 46 upwardly into the position illustrated by FIG. 9E, due to the roller 56 rolling upwardly on the cam ramp 75. During this upward swinging of the support lever 46, a plate support member 77 as mounted on the support lever 46 engages a bottom surface of the filter plate which is being transported by the shifter mechanism and effects upward lifting of this filter plate away from the side rails 13 through a limited vertical extent. Upon reaching the maximum vertical lift as defined by the outer tip of the cam ramp 75, the roller follower 56 falls off the edge 76 down onto the base periphery of the cam, thereby causing a rapid or sudden dropping of the support lever 46 and the filter plate engaged therewith. The filter plate effectively falls freely downwardly and bumps or impacts the side rail 13 so as to impose an impact force on the filter plate which assists in dislodging the filtrate or cake from the exposed sides thereof. During the return movement of the shifter mechanism and leading filter plate to a position adjacent the opened head 14, the filter plate will preferably be vertically lifted and dropped (i.e., bumped) at least twice, although it will be appreciated that the number of bumps or vibrations can be selectively varied by changing the shape and/or rotation speed of the cam and the opening travel distance of the shuttle mechanism. The intensity of the bump can also be controlled by selecting the shape of the cam, including the height of the lift and drop.

Figure 9F:
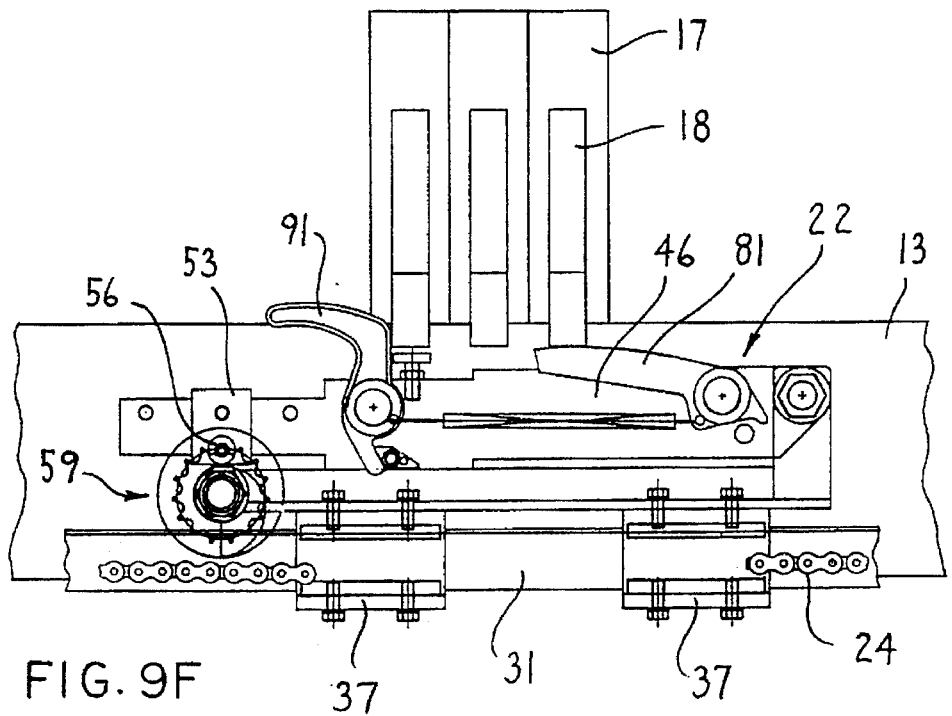
Figure 9G:
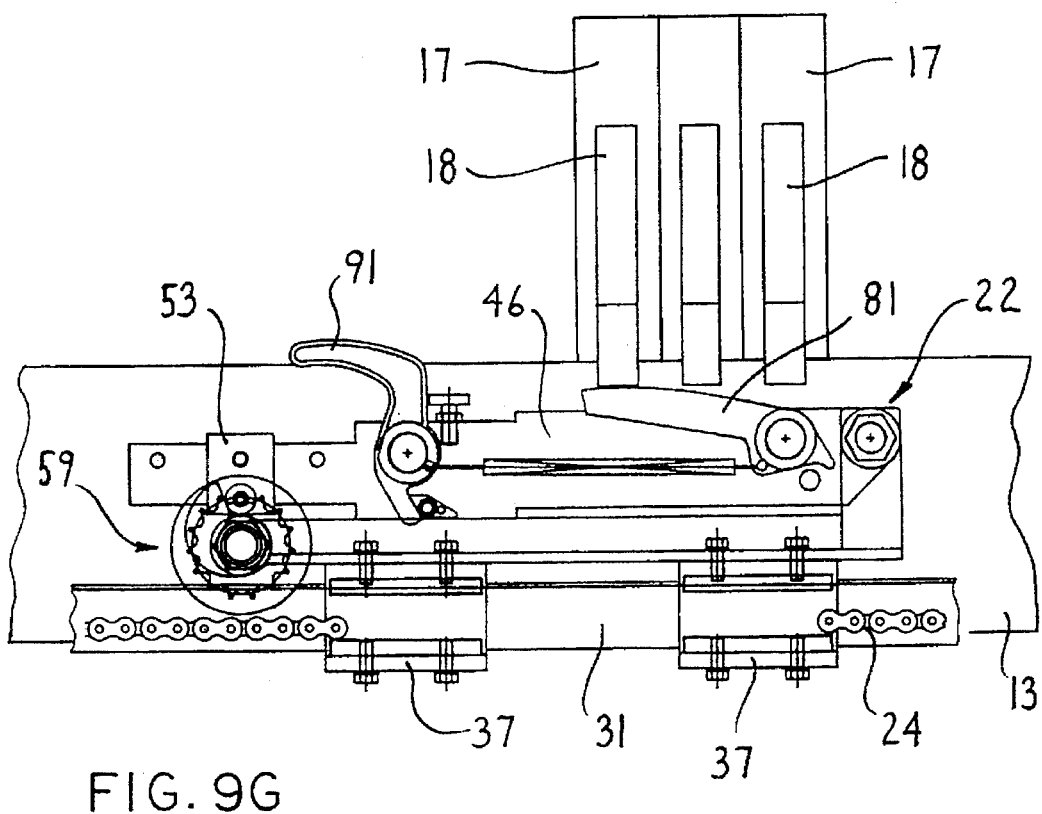

After the shifter mechanism 22 has moved through its return stroke and the filter plate carried therewith has been subjected to one or more (and preferably at least two) bumps, the shifter mechanism reaches the other end of the press and the stop pawl 91 is cammed downwardly against the urging of the spring so as to pass under the handles of any filter plates which have already been moved into the open position. This return movement continues until the shifted filter plate abuts against the head 14 or against any other filter plates which have already been shifted, as diagrammatically illustrated in FIG. 9F. At this point the return movement stalls since further movement of the shifted filter plate is prevented, whereby the torque sensing device associated with the drive motor 27 senses the overload and causes a reversing of the drive motor so as to again move the shifter mechanism forwardly, substantially as illustrated in FIG. 9G, so as to engage and shift the next endmost or leading plate associated with the remaining stack of plates as positioned adjacent the fixed head 15. This cycle continues until all of the movable filter plates defining the stack at the fixed head 15 have been individually and sequentially shifted rearwardly into the opened position so as to define a loose stack adjacent the opened head 14.

After the last filter plate has been shifted into the opened position, the shifter mechanism 22 is again moved forwardly toward the fixed head 15, which head typically has a filter plate fixedly associated therewith, such as illustrated by the plate designated 17' in FIG. 10. As the shifter mechanism 22 approaches the fixed head 15, the free end of the drive pawl 91 contacts the handle on the fixed filter plate 17', causing the drive pawl 91 to be swingably moved downwardly (clockwise) under the hold down rail 102, thereby allowing further forward movement until the shuttle 53 contacts the stop 103 which shifts the shuttle 53 inwardly along the support lever 46 substantially into contact with the shoulder 57. The shuttle is now disposed in a "home" position, in which position the roller 56 no longer engages the cam 73. This also results in the shuttle 53 being positioned under the radially projecting tab 98 associated with the drive pawl 91, which thus prevents the drive pawl 91 from being spring-urged back into its raised position.

Substantially at this same time the free end of the stop pawl 81 contacts the front face of the handle associated with the fixed filter plate 17'. This stalls the forward movement, and the torque sensor reverses the rotation of the driving motor 27 so as to cause return movement (rightward movement) of the shifter mechanism back toward the opened head 14. During this return movement, the drive pawl 91 is retained in its lowered position so that as the shifter mechanism approaches the filter plates positioned adjacent the opened head 14, the stop pawl 81 is cammed downwardly to freely pass under the support handles of the filter plates, and the drive pawl 91 is retain in its lowermost position to also freely pass under the support handles.

As the shifter mechanism 22 reaches the other end of the press, namely the end on which the opened head 14 is supported, the shuttle 53 moves into contact with the nose or free end of the elongate shifter rod 104 which causes the shuttle 53 to be displaced outwardly (leftwardly in FIG. 10) from the "home" position back into the bumping position shown in FIG. 3, in which position the roller follower 56 is again disposed directly over the cam 73. When the shuttle 53 is shifted back into this bumping position, the carrier 35 of the shifter mechanisms also contacts and activates the limit switch 105 which in turn deactivates the drive motor 27, thereby stopping the movement of the shift arrangement and completing the filter plate shifter operation. The press is now in condition to initiate a new cycle of operation.

Figure 11:
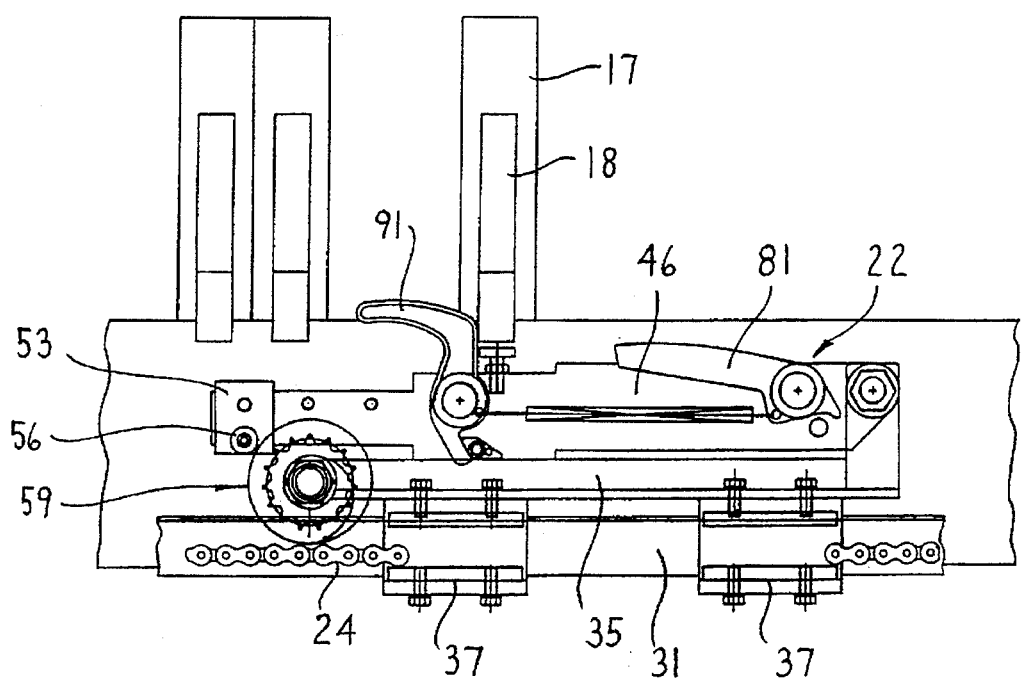
FIG. 11 is a further schematic illustrating the shifting mechanism when in a nonbumping or nonvibrating condition.

In situations where bumping of the filter plates is not desired, then the shuttle 53 can be manually moved into a third position so as to deactivate the vibrating device. As shown in FIG. 11, the inactive position for the shuttle 53 is positioned on the opposite side thereof from the "home" position. The shuttle 53 can be manually moved into the inactive position by the press operator. The shuttle is resiliently retained in any of the three designated positions by the resilient detent plunger 54.

In addition to the capability of varying the frequency and magnitude of the vibration or bump as briefly discussed above, it will be appreciated that the invention as described above also enables selection as to whether bumping is to occur, and the nature of such bumping. For example, the entire filter plate can be bump by positioning the shuttles 53 associated with the two shifter mechanism 22 in the bump position, or to the contrary the bumping mechanism can be deactivated by shifting both shuttles 53 into the inactive position, as briefly discussed above. Alternately, only one side of the plate (selectively either the right or the left side) can be bumped. For example, the shuttle 53 associated with the shifter mechanism on one side of the press can be maintained in the bump position, and the shuttle 53 associated with the shifter mechanism on the other side of the press can be manually moved into the inactivate position. In such situation, only one side of each plate, either the selected right or the selected left side, will be subject to bumping during the opening movement. This type of bumping imposes not only a vertical impact, but a torsional impact which may be beneficial for selected types of cakes. This also provides a capability of adjusting the magnitude of impact of the bump by bumping on only one side, rather than both.

While the preferred embodiment of the invention as described above, pivotally mounts the stop pawl 81 and drive pawl 91 directly on the support or bump lever 46, it will be appreciated that these pawls could be pivotally mounted directly on the carrier 35 if desired. For example, the stop pawl 81 can be pivotally supported directly on the carrier 35, such as for example being supported for pivoting movement about the pivot axis 49. The drive pawl 91 can be similarly pivotally supported directly on the carrier 35, although pivotal mounting of the drive pawl 91 on the bump lever 46, and the positioning of the drive pawl in close proximity to the plate support part is preferred since this ensures that the driving pawl 91 is vertically displaced synchronously with the filter plate with which it is engaged, thereby eliminating or at least significantly minimizing any relative vertical movement therebetween during bumping of the filter plate. In addition, it will be appreciated that while the pawls 81 and 91 are pivotally supported, other forms of support and movement are possible. For example, these pawls could be movably supported for linearly reciprocating movement, although pivoting movement is preferred for simplicity of construction and operation.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a filter press having a frame including a pair of generally horizontally elongated and parallel side rails which are disposed in sidewardly spaced relation, first and second head assemblies mounted on said frame adjacent opposite ends of said side rails, said first head assembly being disposed adjacent one end of said side rails and supported for movement horizontally in a lengthwise direction of the side rails forwardly toward and rearwardly away from said second head assembly so as to be respectively positioned in closed and opened positions, said second head assembly being stationarily positioned adjacent the other end of said side rails, a plurality of individual filter plates supported on and between said side rails for movement therealong between said first and second head assemblies, said plurality of filter plates being pushed together into a horizontally extending closed stack and clampingly held between said first and second head assemblies when said first head assembly is moved toward said second head assembly into said closed position, and a plate shifting arrangement for effecting individual and sequential shifting of said filter plates from said closed stack along said side rails in said rearward direction toward said first head assembly when in the opened position, said plate shifting arrangement including a shifter mechanism movably supported adjacent one of said side rails and being linearly movable in a back-and-forth manner in the lengthwise direction thereof to cause sequential shifting of the individual filter plates from the closed stack along the side rails to a position adjacent the opened first head assembly, comprising the improvement wherein the shifter mechanism mounts thereon a vibrator which includes actuator means for activating said vibrator in response to movement of the shifter assembly in said rearward direction and which cooperates with the shifted filter plate for effecting vertical bumping of the shifted filter plate as the plate is moved toward the opened first head assembly, the actuator means of the vibrator including rotary cam means which is operatively connected between an adjacent one of said side rails and a respective one of said shifter mechanism and includes a rotary cam for converting translational movement of said shifter mechanism into rotational movement, and means for transferring said rotational movement to said rotary cam means such that said cam means is rotated only when the shifter mechanism is moved in said rearward direction, the vibrator further including a bumping member which is vertically movably supported on said shifter mechanism and is engaged with and vertically cyclicly displaced by rotation of the rotary cam means, said bumping member having a part thereof which is positioned under and engages a part of the shifted filter plate to effect lifting and lowering thereof relative to the side rail to create a vertical bumping of the shifted filter plate.

2. A filter press according to claim 1, wherein the cam means includes a part which defines an abrupt vertical drop to cause the bumping member to be suddenly vertically dropped after lifting thereof to cause vertical dropping of the shifted filter plate downwardly onto the side rail.

3. A filter press according to claim 1, wherein the press includes a pair of said shifter mechanisms, one said shifter mechanism being provided adjacent and movable along each of the respective side rails, each said shifter mechanism having a said rotary cam means mounted thereon and defining a part of said vibrator, said pair of shifter mechanisms being free of direct structural interconnection, and said shifter arrangement including a single drive source connected to a pair of elongate intermediate drive members, one of said drive members being provided adjacent and extending along each of the respective side rails and connected to the respective shifter mechanism to effect substantially synchronous linear back-and-forth movement of the pair of shifter mechanisms in the lengthwise direction of the press.

4. In a filter press having a frame including a pair of generally horizontally elongated and parallel side rails which are disposed in sidewardly spaced relation, first and second head assemblies mounted on said frame adjacent opposite ends of said side rails, said first head assembly being disposed adjacent one end of said side rails and supported for movement horizontally in a lengthwise direction of the side rails forwardly toward and rearwardly away from said second head assembly so as to be respectively positioned in closed and opened positions, said second head assembly being stationarily positioned adjacent the other end of said side rails, a plurality of individual filter plates supported on and between said side rails for movement therealong between said first and second head assemblies, said plurality of filter plates being pushed together into a horizontally extending closed stack and clampingly held between said first and second head assemblies when said first head assembly is moved toward said second head assembly into said closed position, and a plate shifting arrangement for effecting individual and sequential shifting of said filter plates from said closed stack along said side rails in said rearward direction toward said first head assembly when in the opened position, said plate shifting arrangement including a shifter mechanism movably supported adjacent one of said side rails and being linearly movable in a back-and-forth manner in the lengthwise direction thereof to cause sequential shifting of the individual filter plates from the closed stack along the side rails to a position adjacent the opened first head assembly, comprising the improvement wherein:

said shifter mechanism includes a housing which is positioned exteriorly adjacent said one side rail and is supported for linear back-and-forth movement along said side rail in the lengthwise direction thereof, a stop member movably supported on said housing and normally maintained in a position for engaging a front face of the endmost filter plate in the closed stack for stopping linear movement of said shifter mechanism in said forward direction, and a plate driving member movably supported on said housing in spaced relationship from said stop member and being movable into a raised position for engaging a rear surface on the endmost exposed plate of the closed stack so as to engage and drivingly push said endmost plate along the side rails toward the opened first head assembly when the shifter mechanism is moved in said rearward direction;

said shifter mechanism mounting thereon a vibrator which includes actuator means for activating said vibrator in response to movement of the shifter assembly in said rearward direction and which cooperates with the shifted filter plate for effecting vertical bumping of the shifted filter plate as the plate is moved toward the opened first head assembly; and said vibrator including a bumping member vertically movably supported on said housing and having an engaging part which is positioned directly under a portion of the endmost filter plate and is vertically raisable for engaging said portion and lifting the endmost filter plate upwardly away from the side rail, said actuator means operatively connected between an adjacent one of said side rails and a respective one of said housings for converting translational movement of said shifter mechanism into vertical bumping movement, said vibrator further including means for transferring said vertical bumping movement to the bumping member to effect vertical cyclic displacement thereof to cause a corresponding vertical vibration of the endmost filter plate only when the endmost filter plate is being movably shifted lengthwise of the press from said closed stack toward the opened head assembly.

5. A filter press according to claim 4, wherein said actuator means comprises a rotary cam which is engaged with and effects cyclic lifting and lowering of the bumping member, and a rotary driving member which reacts with a stationary element which extends longitudinally along the side rail for effecting rotation of the cam only in response to linear displacement of the shifter mechanism along the side rail.

6. A filter press according to claim 5, wherein the actuator means includes a one-way mechanism which is drivingly interposed between the rotary cam and the rotary driving member so as to cause rotation of the rotary cam only when the shifter mechanism is being moved in said rearward direction toward said opened head member.

7. A filter press according to claim 6, wherein said bumping member is pivotally supported on said housing for swinging movement about a generally horizontal axis, and wherein said stop and drive members are also pivotally supported on said housing.

8. A filter press according to claim 6, wherein the pivot axis for said bumping member extends generally transversely with respect to the lengthwise direction and the bumping member is formed as an elongate bumping lever which is elongated away from the pivot axis generally in the lengthwise direction of the side rail, said lever having said plate engaging part provided on an upper portion thereof, said plate engaging part being positioned between said stop member and said drive member in the lengthwise direction of said press.

9. A filter press according to claim 8, wherein said drive member is pivotally supported on said bumping lever in close proximity to said plate engaging part.

10. A filter press according to claim 8, wherein said bumping lever movably mounts thereon a cam follower member which is movable with respect to the bumping lever between a first position wherein it is disposed for engagement with the rotary cam and a second position wherein it is maintained out of engagement with the rotary cam so as to deactivate the vibrator.

11. A filter press according to claim 6, wherein the press includes a pair of said shifter mechanisms, one said shifter mechanism being provided adjacent and movable along each of the respective side rails, each said shifter mechanism having a said rotary cam mounted thereon and defining a pair of said vibrators, said pair of shifter mechanisms being free of direct structural interconnection, and said shifter arrangement including a single drive source connected to a pair of elongate intermediate drive members, one of said drive members being provided adjacent and extending along each of the respective side rails and connected to the respective shifter mechanism to effect substantially synchronous linear back-and-forth movement of the pair of shifter mechanisms in the lengthwise direction of the press.

12. A filter press according to claim 4, wherein the press includes a pair of said shifter mechanisms, one said shifter mechanism being provided adjacent and movable along each of the respective side rails, each said shifter mechanism having a rotary cam mounted thereon and defining a pair of said vibrators, said pair of shifter mechanisms being free of direct structural interconnection, and said shifter arrangement including a single drive source connected to a pair of elongate intermediate drive members, one of said drive members being provided adjacent and extending along each of the respective side rails and connected to the respective shifter mechanism to effect substantially synchronous linear back-and-forth movement of the pair of shifter mechanisms in the lengthwise direction of the press.

13. In a filter press having a frame including a pair of generally horizontally elongated and parallel side rails which are disposed in sidewardly spaced relation, first and second head assemblies mounted on said frame adjacent opposite ends of said side rails, said first head assembly being disposed adjacent one end of said side rails and supported for movement horizontally in a lengthwise direction of the side rails forwardly toward and rearwardly away from said second head assembly so as to be respectively positioned in closed and opened positions, said second head assembly being stationarily positioned adjacent the other end of said side rails, a plurality of individual filter plates supported on and between said side rails for movement therealong between said first and second head assemblies, said individual filter plates having handles which project outwardly from opposite sides thereof and are slidably supported on said side rails, said plurality of filter plates being pushed together into a horizontally extending closed stack and clampingly held between said first and second head assemblies when said first head assembly is moved toward said second head assembly into said closed position, and a plate shifting arrangement cooperating with handles of the filter plates for effecting individual and sequential shifting of said filter plates from said closed stack along said side rails in said rearward direction toward said first head assembly when said first head assembly is in the opened position, said plate shifting arrangement including a shifter mechanism movably supported adjacent one of said side rails and being linearly movable in a back-and-forth manner in the lengthwise direction thereof to cause sequential shifting of the individual filter plates from the closed stack along the side rails to a position adjacent the opened first head assembly, comprising the improvement wherein said shifter mechanism includes: a housing which is positioned exteriorly adjacent said one side rail and is supported for linear back-and-forth movement along said side rail in the lengthwise direction thereof, a stop member movably supported on said housing and normally maintained in a position for engaging a front face of the handle of the endmost filter plate in the closed stack for stopping linear movement of said shifter mechanism in said forward direction, a plate driving member movably supported on said housing in lengthwise spaced relationship from said stop member and being movable into a raised position for engaging a rear surface on the handle of the endmost filter plate of the closed stack so as to engage and drivingly push said endmost filter plate along the side rails toward the opened first head assembly when the shifter mechanism is moved in said rearward direction, said stop and driving members being individually pivotally supported for vertical swinging movement adjacent opposite ends of said housing so that pivot axes for said stop and driving members are fixedly maintained a predetermined distance apart generally along said lengthwise direction, and a vibrator mounted on the housing and cooperating with the endmost filter plate for effecting vertical bumping thereof to assist in removal of solids from the filter plate, said vibrator including a bumping member vertically movably supported on said housing and having an engaging part which is positionable directly under and is vertically raisable for engaging a respective one of said handles and lifting the endmost filter plate upwardly away from the side rail, said bumping member being positioned lengthwise between said stop member and said driving member, and an actuator mounted on the housing and cooperating with the bumping member to effect vertical cyclic displacement thereof to cause a corresponding vertical bumping of the endmost filter plate.

14. A filter press according to claim 13, wherein the press includes a pair of said shifter mechanisms, one of said shifter mechanisms being provided adjacent and movable along each of the respective side rails, each said shifter mechanism having a said vibrator mounted on the respective housing thereof, said pair of shifter mechanisms being free of direct structural inter-connection, and said shifter arrangement including a single drive source connected to a pair of elongate intermediate drive members, one of said drive members being provided adjacent and extending along each of the respective side rails and connected to the housing of the respective shifter mechanism to effect substantially synchronous linear back-and-forth movement of the pair of shifter mechanism in the lengthwise direction of the press.

15. In a filter press having a frame including a pair of generally horizontally elongated and parallel side rails which are disposed in sidewardly spaced relation, first and second head assemblies mounted on said frame adjacent opposite ends of said side rails, said first head assembly being disposed adjacent one end of said side rails and supported for movement horizontally in a lengthwise direction of the side rails forwardly toward and rearwardly away from said second head assembly so as to be respectively positioned in closed and opened positions, said second head assembly being stationarily positioned adjacent the other end of said side rails, a plurality of individual filter plates supported on and between said side rails for movement therealong between said first and second head assemblies, said individual filter plates having handles which project outwardly from opposite sides thereof and are slidably supported on said side rails, said plurality of filter plates being pushed together into a horizontally extending closed stack and clampingly held between said first and second head assemblies when said first head assembly is moved toward said second head assembly into said closed position, and a plate shifting arrangement cooperating with handles of the filter plates for effecting individual and sequential shifting of said filter plates from said closed stack along said side rails in said rearward direction toward said first head assembly when said first head assembly is in the opened position, said plate shifting arrangement including a shifter mechanism movably supported adjacent one of said side rails and being linearly movable in a back-and-forth manner in the lengthwise direction thereof to cause sequential shifting of the individual filter plates from the closed stack along the side rails to a position adjacent the opened first head assembly, comprising the improvement wherein said shifter mechanism includes:

a housing which is positioned on said one side rail and is supported for linear back-and-forth movement along said side rail in the lengthwise direction thereof, a stop member movably supported on said housing and normally maintained in a position for engaging the endmost filter plate in the closed stack for stopping linear movement of said shifter mechanism in said forward direction, a plate driving member movably supported on said housing to engage and drivingly push said endmost filter plate along the side rails toward the opened first head assembly when the shifter mechanism is moved in said rearward direction, and a vibrator mounted on the housing and cooperating with the endmost filter plate for effecting vertical bumping thereof to assist in removal of solids from the filter plate, said vibrator including a bumping member vertically movably supported on said housing and having an engaging part which is positionable directly under and is vertically raisable for engaging a respective one of said handles and lifting the endmost filter plate upwardly away from the side rail, and an actuator mounted on the housing and cooperating with the bumping member to effect vertical cyclic displacement thereof to cause a corresponding vertical bumping of the endmost filter plate.

\* \* \* \* \*